United States Patent [19]

Kern

[11] 3,973,860
[45] Aug. 10, 1976

[54] CLAMPING DRILL JIGS ON SKIS
[75] Inventor: Walter J. Kern, Riverside, R.I.
[73] Assignee: Austrian Ski and Machine Corporation, Cranston, R.I.
[22] Filed: Apr. 16, 1974
[21] Appl. No.: 461,272

[52] U.S. Cl. .............................. 408/108; 408/115 R; 269/254 R
[51] Int. Cl.² ........................................ B23B 49/00
[58] Field of Search ............ 408/108, 72, 72 B, 114, 408/115, 103; 269/254 R, 254 D, 254 DF, 254 CS, 254 MW; 81/3.42

[56] References Cited
UNITED STATES PATENTS

| | | |
|---|---|---|
| 2,478,471 | 8/1949 | Edlund................................ 81/3.42 |
| 2,783,665 | 3/1957 | Saunders............................ 408/108 |
| 3,608,885 | 9/1971 | Roth ......................... 269/254 CS X |
| 3,711,215 | 1/1973 | Brown............................... 408/108 |

Primary Examiner—Othell M. Simpson
Assistant Examiner—W. R. Briggs

[57] ABSTRACT

A clamp, useful in mounting a drill jig having a base plate with drill guides on a ski for boring holes for bindings, comprising a pair of jaws having face portions and mountable on the base plate, the jaws being moveable with respect to the base plate and the face portions opposing each other, means for biasing the jaws toward a first closed position, and manually operable means for overcoming the biasing means to move the jaws to a second open position. In a preferred embodiment the jaws have rack portions engageable with a pinion rotatable with the manually operable means, at least one of the faces has an adjustable stop for centering the jig on the ski, and a torsion spring contained within the manually operable means provides the biasing means.

3 Claims, 6 Drawing Figures

FIG 1
FIG 2
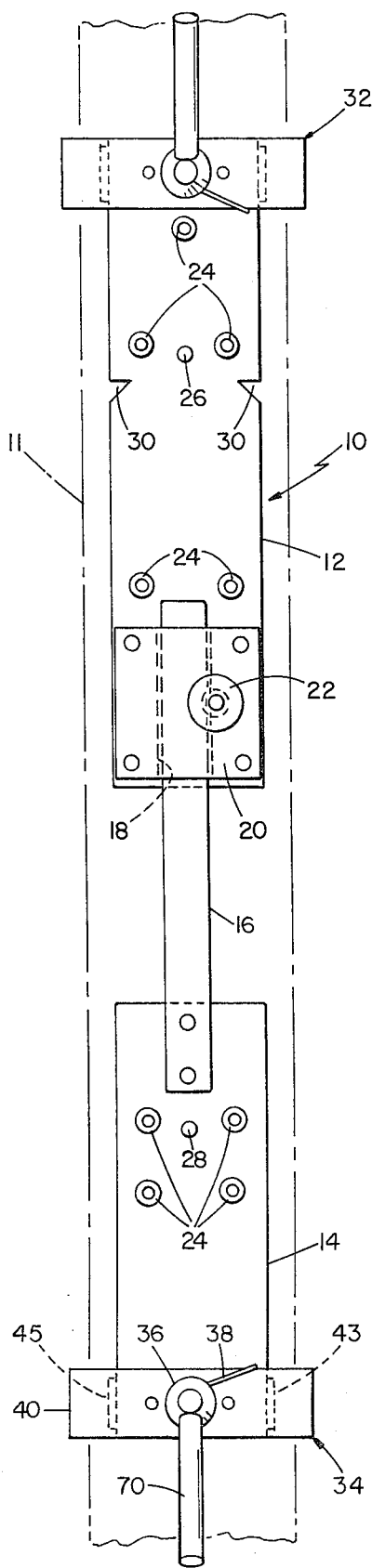
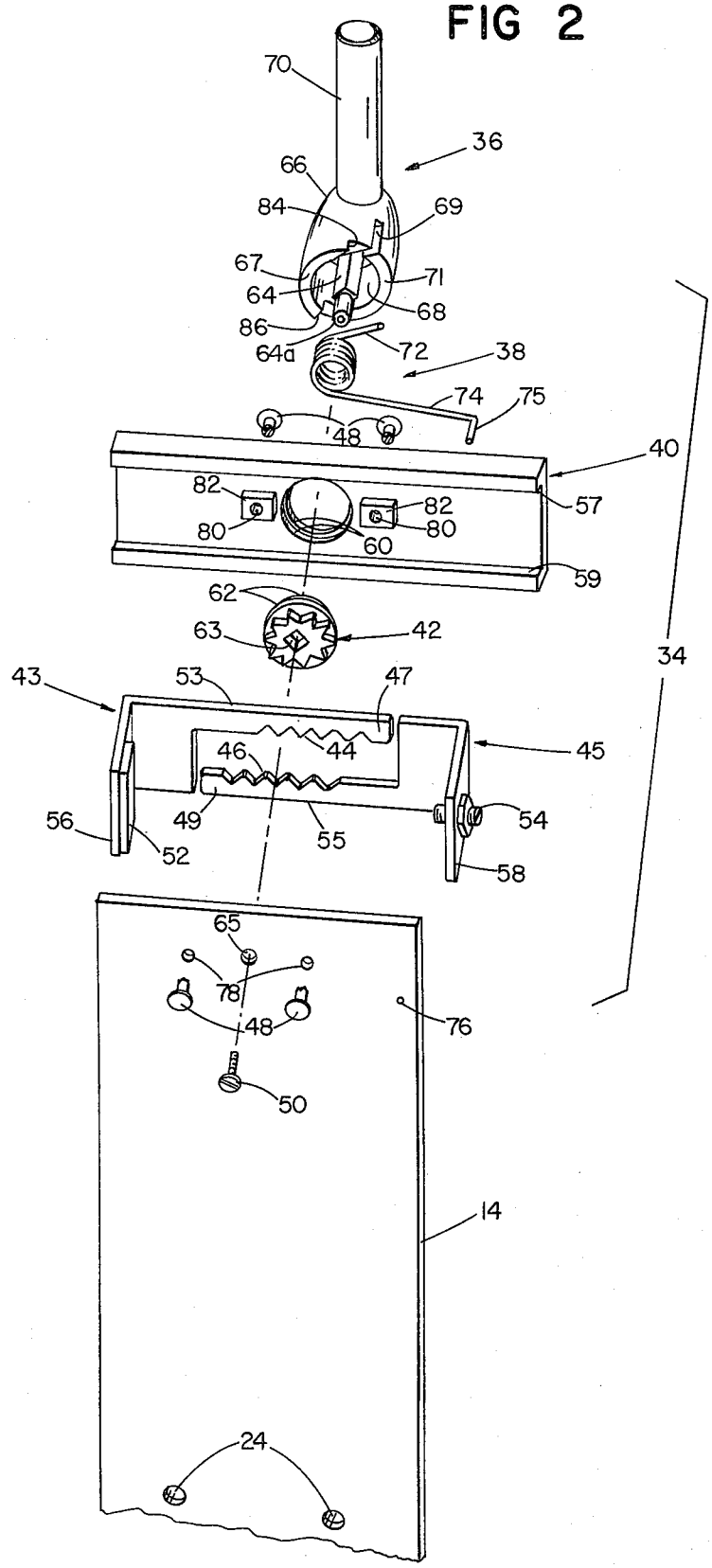

CLAMPING DRILL JIGS ON SKIS

BACKGROUND OF THE INVENTION

This invention relates to clamping drill jigs on skis for boring holes for bindings.

In clamps that have jaw members on each side of the ski, it is important that the force closing each jaw be equal on both sides in order that the jig be properly centered on the ski so that the binding will be properly mounted on the ski.

SUMMARY OF THE INVENTION

The invention provides a simple, inexpensive, easy to manufacture, and convenient to use clamp for mounting a drill jig on a ski.

The invention provides a uniform force for quickly closing a pair of clamp jaws against each side of a ski and allowing accurate placement of the drill jig properly centered on the ski. The invention is safe to use in that resilient parts are covered, if breakage should occur.

In general the invention features a clamp useful in mounting on a ski a drill jig having a base plate with drill guides, the clamps comprising a pair of jaws which have face portions and are mountable on the base plate, the jaws being moveable with respect to the base plate and the inner face portions of the jaws opposing each other, means for biasing the jaws toward a first closed position, and manually operable means for overcoming the biasing means to move the jaws to a second open position. Preferred embodiments feature jaws having rack portions and a pinion rotatable by the manually operable means and engageable with the rack portions; manually operable means comprising a cap and arm, the biasing means being a spring and the major portion of the spring being contained within the cap; a cap having a retaining portion and the spring being a torsion spring with end legs, one leg engageable by the cap retaining portion and the other extending outside the cap to engage the base plate; at least one jaw having an adjustable stop for centering the jig on the ski; and a cover for the rack portions of the jaws.

Other advantages and features of the invention will be apparent from the description and drawings herein of a preferred embodiment thereof.

BRIEF DESCRIPTION OF THE DRAWINGS

FIG. 1 is a plan view of a pair of embodiments of the invention.

FIG. 2 is an underside, exploded isometric view of one embodiment of the invention.

DESCRIPTION OF THE PREFERRED EMBODIMENT

Figure 3:
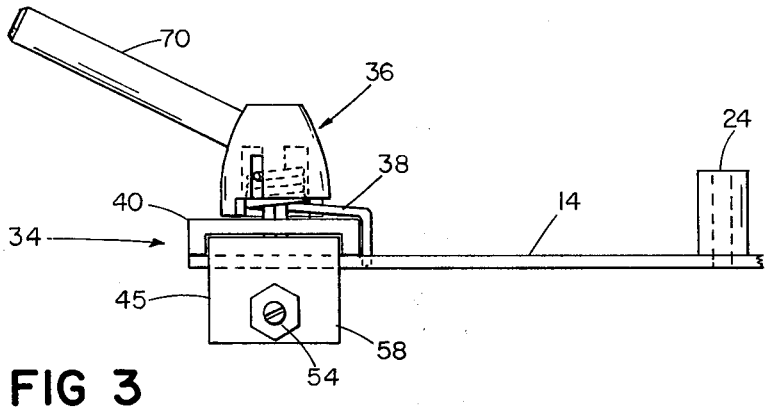
FIG. 3 is a side view of the assembled embodiment of FIG. 2.
Figure 4:
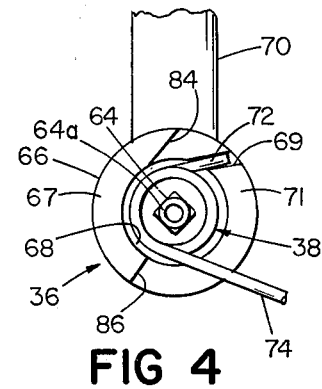
FIG. 4 is an underside view of the handle and spring used in the embodiment of FIG. 3.
Figure 5:
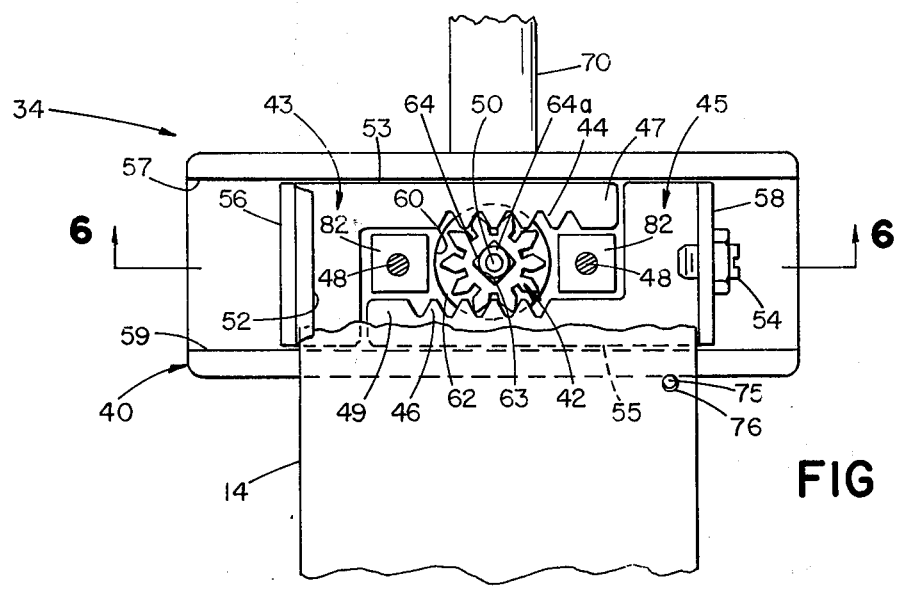
FIG. 5 is an underside view, partially broken away, of the assembled embodiment of FIG. 2.

There is shown in FIG. 1 a clamping jig 10 mounted on ski 11 for drilling holes in the ski for mounting bindings thereon. The jig comprises toe base plate 12 and heel base plate 14 connected by bar 16 which is fixed to heel base plate 14 and is slidable within channel 18 formed in alignment plate 20 fixed to toe base plate 12. Knurled thumb nut and keyed captive screw 22 hold bar 16 at a desired position. Hardened steel drill bushings 24 on toe and heel plates maintain the correct positional relation between holes in the ski, the particular bushing locations depending on the type of binding chosen. Toe alignment pin 26 and heel alignment pin 28 abut the toe and heel, respectively, of a selected boot. Notches 30 enable the centerline of jig 10 to be located on the centerline of ski 11. Clamps 32, 34 are mounted at each end of the jig. Since both clamps have the same structural details, clamp 34 will hereinafter be described, as shown in FIGS. 2–6.

Figure 6:
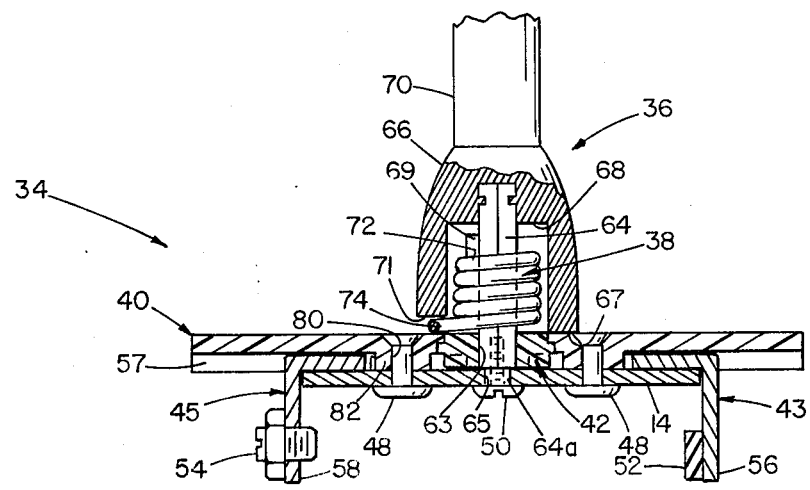
FIG. 6 is a section through 6—6 of FIG. 5.

As shown in FIG. 2, clamp 34 includes handle 36, torsion spring 38, clamp cover 40, pinion 42, jaws 43, 45, rivets 48, and screw 50. Rack portions 44, 46 of metal jaws 43, 45 rest on the top of heel plate 14 and engage poly (vinyl chloride) pinion 42 with grip portions 56, 58 extending downwardly from the base plate. Stepped annular portion 60 of poly (vinyl chloride) cover 40 engages stepped cylindrical portion 62 of pinion 42, and the outer edges 53, 55 of rack portions 44, 46 slide against bearing surfaces 57, 59 of cover 40. Handle 36, made of one-piece cast aluminum, includes cap 66 and arm 70. Rectangular steel post 64 with forward cylindrical portion 64a contains a threaded bore and is fitted at the top into cap 66, centrally located in cavity 68 as shown in FIG. 6. Torsion spring 38 is seated on post 64 with end 72 fitting in vertical slot 69 and longer end 74 extending across cover 40 where bent portion 75 extends over the cover edge and into hole 76 in base plate 14. Rivets 48 fasten cover 40 to base plate 14 through countersunk holes 80 in cover posts 82 and plate holes 78. Rectangular post 64 fits through square aperture 63 of pinion 42 and cylindrical portion 64a fits through plate hole 65. Screw 50 threaded into the bore of post 64 secures handle 36 to plate 14. Rubber bumper 52 is glued by epoxy to the inner face of grip portion 56. Center adjustment screw with locknut 54 is threadably received in grip portion 58.

In operation, a boot is placed on jig 10 with the toe abutting toe alignment pin 26 and the heel plate is slidably moved until heel alignment pin 28 abuts the boot heel. Knurled thumb nut 22 is then tightened to maintain the toe and heel plates in that position, and the boot is removed. Jig 10 is then placed over ski 11 at a proper distance lengthwise of the ski; and notches 30 are used to line up the centerline of the jig with the ski centerline. Arm 70 of heel clamp 34 is pulled approximately 90° in a clockwise direction, further loading spring 38 and rotating rectangular post 64, thereby rotating pinion 42 through engagement of post 64 and squared aperture 63. Pinion 42 simultaneously engages rack portions 44, 46, driving them outwardly, in opposite directions, the travel of both racks being identical because the torquelines are equidistant from the axis of the pinion. Rack ends 47, 49 prevent jaws 43, 45 from falling out of clamp 34 and oppose further rotation of pinion 42. In the closed position the distance between jaws (not including the bumper and center adjustment screw) is 2¾ inches. In the opened position the distance is 3¾ inches. Hence in the opened position, grip portions 56, 58 easily fit over standard downhill skis which are usually between 2¾ and 3 inches wide. The same manipulations are performed on toe clamp 32 except that its arm is moved 90° counterclockwise to open it (the clamps shown are structurally related as right hand to left hand), so jig 10 can be placed flush atop ski 11. Arm 70 is then released, allowing spring 38 to unload against cap 66, rotating the cap and post 64, and thereby pinion 42 to bring rack portions 44, 46 toward each other until further inward travel of jaws 43, 45 is stopped by ski 11. The same is done with clamp 32, and jig 10 is firmly clamped to ski 11. To remove the jig after drilling, the same operation is again performed. Cap 66 has recessed portion 71 to allow unimpeded rotation of cap 66 without interfering with spring end 74. However if arm 70 is pulled farther than necessary to open the clamp, spring end 74 will be forced against edge 84 of solid portion 67 and will break before pinion gear 42 can be damaged by rack ends 47, 49. Also edge 86 prevents turning handle 36 in the wrong direction. Spring 38 is easily replaced by removing screw 50 and then handle 36. Cap 66 covering spring 38, except for end 74, prevents a broken spring from flying off.

If rubber bumper 52 should wear down, center adjustment screw 54, whose inner face abuts ski 11, can be positioned so that jig 10 will still be centered over ski 11.

In the closed position for each clamp, arm 70 and the respective arm of clamp 32 extend parallel to a line connecting pins 26 and 28, as shown in FIG. 1.

The pinion and double rack arrangement has been used in certain bottle opening devices, but the purpose here is wholly different and the whole clamp apparatus including biased handle is not suggested by such devices.

Other embodiments within the invention will be apparent to those skilled in the art.

I claim:

1. A clamp for a drill jig for boring holes in a ski for mounting a binding thereon, said drill jig comprising
   a base plate having a plurality of drill holes therethrough,
   said drill holes corresponding to the holes of a binding, and
   a plurality of drill guides attached to said base plate, said drill guides extending transversely from said plate and aligned with said drill holes,
   said clamp comprising:
   a pair of jaws mounted on said base plate and movable with respect to said base plate, said jaws having inner face portions opposing each other, and said face portions being adapted to grip the sides of a ski, each said jaw having a rack portion,
   means for biasing said jaws toward a first closed position for securing a ski to said base plate with said drill guides and drill holes aligned with said ski for boring therethrough comprising a torsion spring having a pair of end legs,
   means for overcoming said biasing selectively to move said jaws to a second open position in which a ski can be inserted before boring and removed thereafter comprising a cap with a retaining portion and an arm, the major portion of said spring being contained within said cap, one leg of said torsion spring being engaged by said retaining portion and the other leg of said spring extending outside said cap to engage said base plate, and
   a pinion, said pinion being rotatable by said biasing means and by said overcoming means, said pinion being engageable with said rack portion so that said pinion can move said jaws between said first and second positions.

2. The drill jig clamp of claim 1 wherein at least one of the face portions of said jaws has an adjustable stop for centering said jig on said ski.

3. The drill jig clamp of claim 1 further comprising a cover, said cover fitting over said rack portions.

* * * * *